INVENTOR.
ARTHUR W. SEYFRIED
BY
Bertha L. MacGregor
ATTORNEY

INVENTOR.
ARTHUR W. SEYFRIED
BY
Bertha L. MacGregor
ATTORNEY

July 19, 1966  A. W. SEYFRIED  3,261,997

SHAFT BEARING MOUNTING MEANS FOR MOTORS AND OTHER MECHANISMS

Filed Aug. 2, 1965  3 Sheets-Sheet 3

INVENTOR.
ARTHUR W. SEYFRIED
BY
Bertha L. MacGregor
ATTORNEY

United States Patent Office 3,261,997
Patented July 19, 1966

3,261,997
SHAFT BEARING MOUNTING MEANS FOR MOTORS AND OTHER MECHANISMS
Arthur W. Seyfried, Cleveland, Ohio, assignor to Scovill Manufacturing Company, Waterbury, Conn., a corporation of Connecticut
Filed Aug. 2, 1965, Ser. No. 476,327
11 Claims. (Cl. 310—90)

This invention relates to shaft bearing mounting means for motors and other mechanisms.

An object of the invention is to provide shaft bearing supporting means in which costly machining operations presently required for obtaining desired accurate concentric relationship between the shaft, shaft bearings and shaft bearing supporting means may be eliminated. The advantages of the invention are attained by employing a recessed support for a ball bearing, the recess being larger than the bearing and being unmachined, in combination with a separate bearing plate in the form of a thin flat stamping which is punched to provide a central opening of such size that the concentric edge of the opening snugly fits and engages the peripheral surface of the ball bearing and supports the bearing in the recessed support.

This application is a continuation-in-part of my copending application U.S. Serial No. 146,881 filed October 23, 1961, now abandoned, in which this invention was described as embodied in a vacuum cleaner motor. As will be understood from the accompanying drawings and description, the invention is equally useful and adapted for embodiment in vacuum cleaner and other motors and in mechanisms other than motors wherein shaft bearing mounting means are utilized.

When embodied in motor constructions, an object of the invention is to provide shaft bearing supporting means in the motor housing members which are concentric with each other, with the motor shaft and with the inner surfaces of the pole pieces, whereby an air gap uniform in radial width is provided between the armature and the field pole pieces to insure a quiet running motor and freedom from vibration.

Another object is to construct the motor housing to include means for mounting the pole pieces therein in such manner that accurate concentricity between said pieces and the motor shaft and bearings is insured.

Another object of the invention is to produce a motor having the characteristics aforementioned without employing the costly machining operations presently required for obtaining the desired accurate concentric relationship between the motor shaft, shaft bearings, shaft bearing supporting means and inner surfaces of the pole pieces.

Motors heretofore known comprise a first housing member in the form of a die cast motor frame provided with a bore machined to close tolerances to receive a ball bearing for the motor shaft, and a generally cup shaped die casting which forms a second housing member connected to the first member. An end bearing mounting for the shaft is a part of the second housing. The conventional method of obtaining accurate axial alignment and concentricity of the motor frame bearing bore, and bearing mounting and field location is to subject parts to a screw machine operation followed by a slow and costly machining operation to diamond bore the bearing bores to the close tolerances which cannot be obtained on a screw machine.

By the use of my invention, the close fitting of the shaft bearing in the bore of the die cast frame is unnecessary and the machining to close tolerances is eliminated as hereinafter explained.

Figures 1, 4:
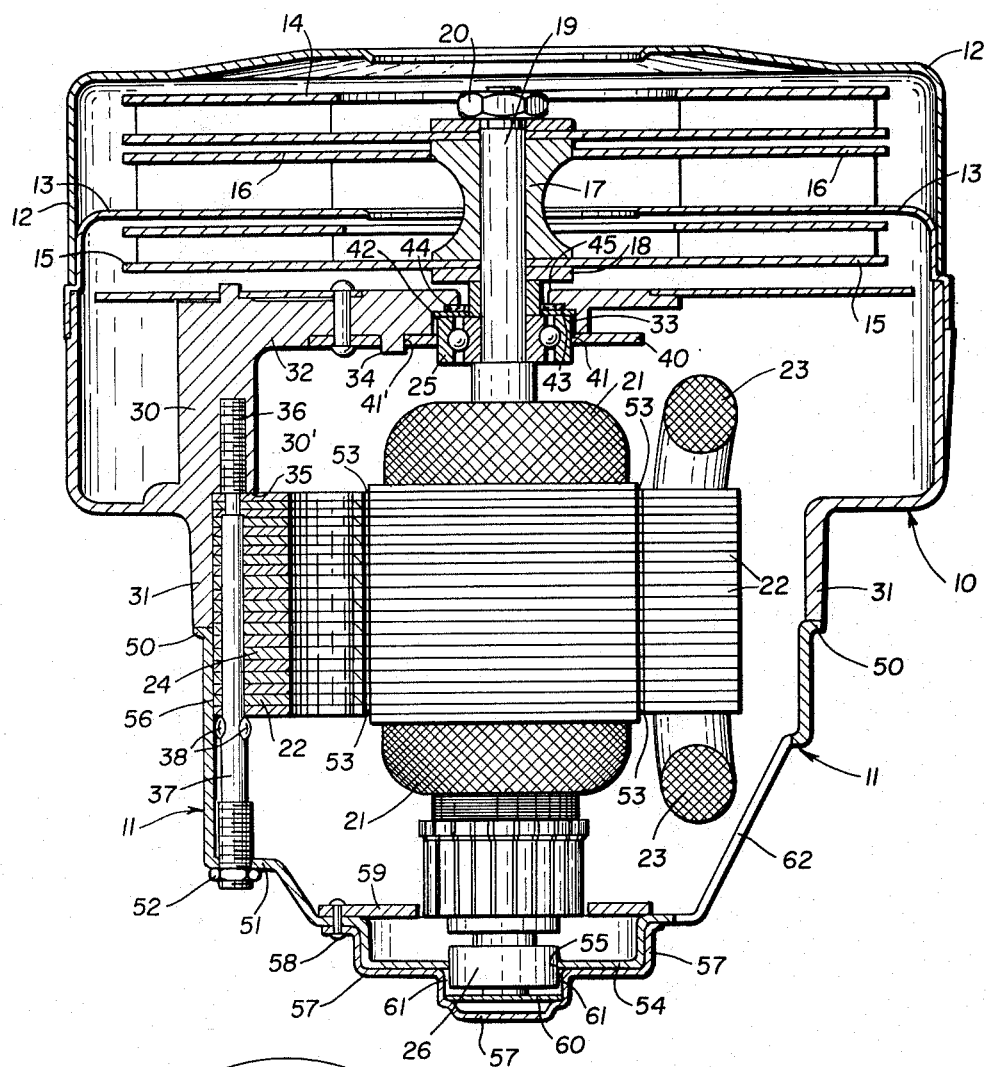
FIG. 1 is a vertical sectional view of a motor in the planes of the lines 1—1 of FIG. 2, showing one embodiment of my invention.
FIG. 4 is a plan view of the bearing supporting plate detached from the motor shown in FIG. 1.
Figure 2:
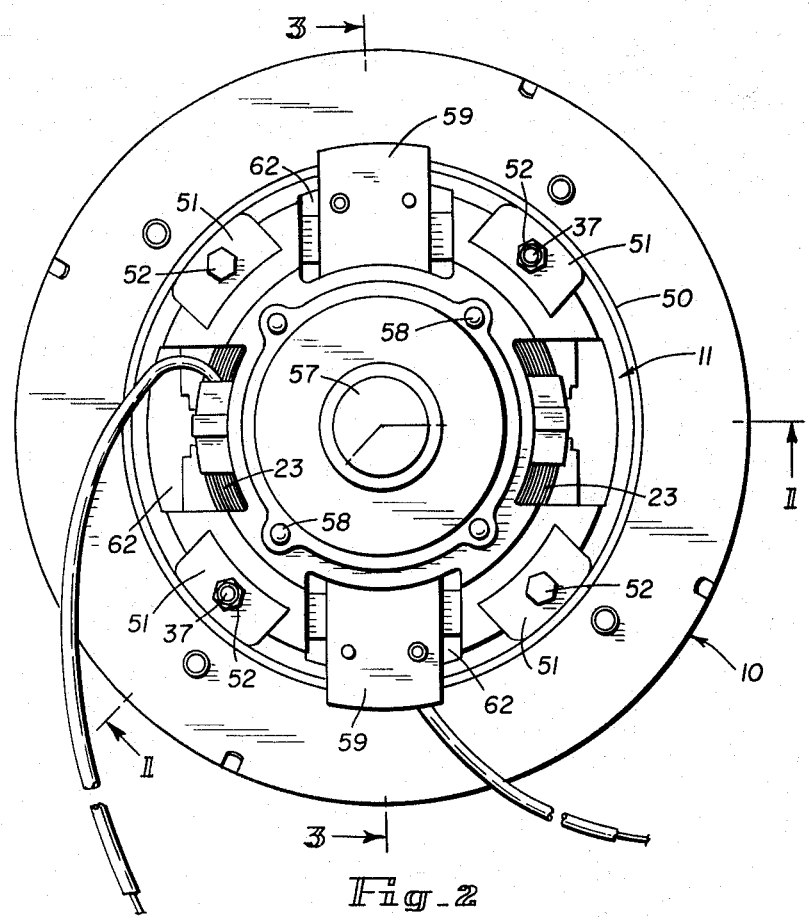
FIG. 2 is a bottom plan view of the motor of FIG. 1 on a reduced scale.
Figure 3:
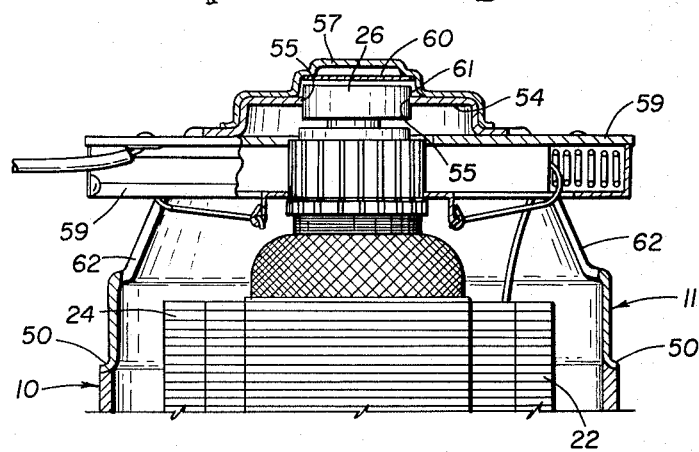
FIG. 3 is a vertical sectional view of the lower portion of the motor, in the plane of the line 3—3 of FIG. 2.

In FIG. 1, the motor embodying my invention is vertically disposed. The motor comprises a die cast frame 10 which provides an upper housing, and a generally cup shaped steel stamping 11 which forms a lower housing. A first stage fan housing 12 is telescoped on a second stage fan housing 13 telescopically mounted on the upper peripheral edge of the die cast motor frame 10. The fan housings enclose fans 14, 15, a vaned baffle plate 16 and fan spacers 17, 18 on the motor-fan shaft 19. The fan assembly is held on the shaft by the nut 20. Conventional parts of the motor include the armature 21, field poles 22, field windings 23, field core 24, upper ball bearing 25 and lower ball bearing 26 for the shaft 19.

Figure 7:
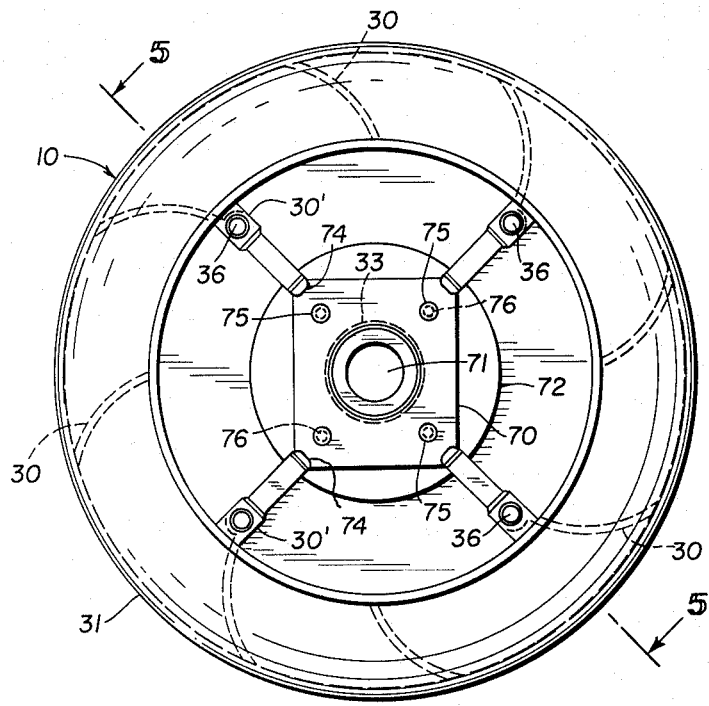
FIG. 7 is a bottom plan view of the construction shown in FIG. 5.

The die cast frame 10 comprises a plurality of vertically extending vanes 30, shown in FIG. 1, and curved in horizontal cross section as shown in dotted lines in FIG. 7. The vanes 30 are integral with the outer annular side wall 31, and four of said vanes are integral at their inner ends with a radially extending wall 32 which has die cast therein a recess 33 for reception of the ball bearing 25. As shown in FIG. 1, the bore 33 is cast larger than the bearing 25 and is not machined. The radial wall 32 is cast with four bosses 34 spaced equi-distantly circumferentially on its lower surface and equally spaced radially from the bore 33. The four vanes 30 which are integral with the radial wall 32 have thickened members 30' which are parallel to the axis of the frame 10 and have horizontally disposed lower shoulder surfaces 35 which bear on the field core 24 and are provided with threaded stud holes 36 for reception of the threaded ends of four studs 37 which connect the field assembly to the die cast motor frame 10. The studs 37 have nibs 38 on their sides to hold the field core 24 firmly on the die cast frame wall 30.

Figure 8:
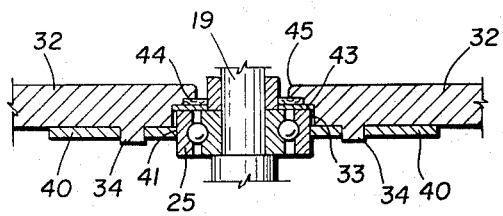
FIG. 8 is a sectional view of a shaft bearing support, a ball bearing and bearing mounting means embodying my invention, suitable for mounting motor shafts or shafts in other mechanisms.

A separate bearing plate 40, shown in FIGS. 1, 4 and 8, is punched and shaved to provide a central opening 41 of such size that the concentric edge of the hole snugly fits and engages the peripheral surface of the ball bearing 25. The plate 40 when mounted on the frame wall 32 is in radial alignment with the ball race of the bearing 25. The plate is a metal stamping .050″ thick. Simultaneously with the punching of the central opening 41, the plate 40 also is punched to provide four holes 41' spaced equi-distantly circumferentially and equally spaced radially from the central bearing hole 41 to register with and receive the bosses 34 which are spun over to retain the plate 40 in contact with the lower surface of the wall 32.

The die cast frame 10, in the embodiment shown in FIGS. 1–4, is cast with the four bosses 34 and with the four field stud holes 36 accurately positioned relatively to the bosses 34. The bosses and holes are cast from the same side of the die and are as accurate as the die employed in the casting. Since the bearing plate 40 has its central bearing hole 41 and its four boss holes 41' punched accurately relatively to each other, and the stud holes 36 and bore 33 are cast accurately concentric, the assembled parts are also concentric. True concentricity of the bearing supporting plate 40 and the die cast motor frame 10 is achieved without any machining of the parts.

After the bearing supporting plate 40 has been positioned and the bosses 34 spun over, with the bearing 25 in the central opening as shown in FIG. 1, a steel washer 42 is placed next to the open side of the bearing to keep the grease therein. The washer 42 contacts a shoulder 43 cast in the inner surface of the bore 33. End thrust of the armature is located next to the steel washer 42 and is retained by the part 45 of the wall 32 adjacent the bore 33.

The lower cup shaped housing 11 has an outwardly directed flange 50 on its peripheral edge which stiffens the stamping and bears against the lower annular edge of the die cast frame wall 31. The studs 37 which connect the field core 24 to the die cast frame 10 also connect the housing 11 to said frame 10 by extending through four radially extending shoulders 51 of the housing 11. Threaded nuts 52 on the ends of the studs 37 bear against the shoulder surfaces 51 and hold the housing 11 and its flange 50 as well as the field assembly 24 firmly in position relatively to the die cast frame 10, with the pole pieces 22 spaced from the armature 21 by an air gap 53 of uniform radial width.

The lower end 54 of the housing 11 is perforated and shaved to provide an opening to fit the ball bearing 26 in which the lower end of the shaft 19 is mounted. This opening defined by the edge 55 is concentric with the annular path in which are located the four field stud holes 36, and with the field core contacting portion 56 of the housing 11, as well as with the opening 41 in plate 40 supporting ball bearing 25. A separate end cap 57 is riveted at 58 to the part 54 of housing 11 and to the brush holder 59. The end cap 57 encloses a spring washer 60 which gives end thrust to the bearings and contains an extra supply of grease. The end cap 57 does not contact the peripheral surface of the bearing 26 but is spaced therefrom as indicated at 61. The edge 55 defining the bearing opening in the part 54 of housing 11 is in radial alignment with the ball race of the bearing 26 for bearing support.

Four air current openings 62 are punched through the inclined wall portion of the housing 11 from the inside in one operation.

It will be understood that since the four field stud holes 36, the four bosses 34 for engaging bearing supporting plate 40, and the bearing bore 33 are die cast in the die cast frame 10, in one operation and from the same side of the die, they are as accurate as the die and not subject to variations encountered in screw machine work. The bearing opening in the lower housing 11, defined by edge 55 in part 54 of the housing, is concentric with the four field stud holes 36 in housing 10 and with the axis of the field contacting wall 56 of the housing 11. The plate 40 is accurately punched to provide the central bearing opening 41 and the four holes 41' for receiving bosses 34, to thereby concentrically locate the plate and its opening relatively to the bore 33. The bearing 25 thus is located in the concentrically punched and located plate 40, and bearing 26 in the concentrically punched end wall 54 of housing 11. The bearing 25 may be peripherally shaved to fit the punched hole 41 of the plate 40.

Figure 5:
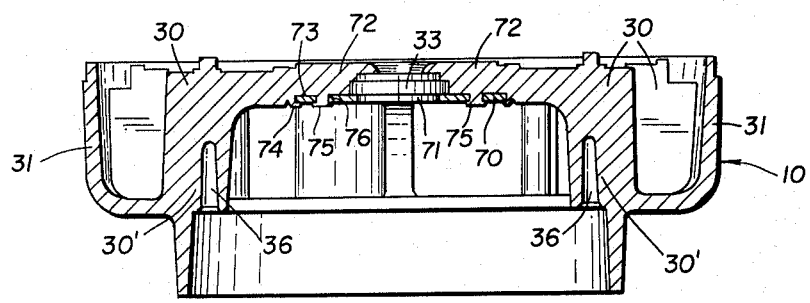
FIG. 5 is a vertical sectional view of part of a motor showing a modification of the motor of FIG. 1, in the plane of the line 5—5 of FIG. 7.
Figure 6:
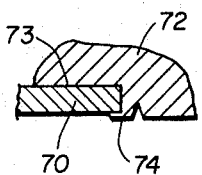
FIG. 6 is an enlarged view of a detail of construction of the motor of FIG. 5.

FIGS. 5–7 show a modification of the means for mounting the ball bearing supporting plate. The modified plate, designated 70, is provided with a concentric opening 71 punched and shaved to snugly receive the bearing 25. As shown, the modified plate 70 is square, with parallel opposite side edges, and rounded corner edges concentric with the opening 71. The die cast frame 10 has a radial wall 72 similar to the radial wall 32 of FIG. 1, but in this modification the wall 72 is cast with a recess 73 in its lower face, the recess 73 being shaped to receive the plate 70 and to accurately locate the plate in concentric relationship to the stud holes 36, field assembly 22–24 and bore 33. The plate 70 is retained on the radial wall 72 by projections or bosses 74 cast on the wall 72 as shown in FIGS. 6 and 7 in such positions that they engage the peripheral rounded edges at the corners of the plate 70 by being pressed against the exposed face of the plate after it has been placed in the recess 73 in wall 72. Preferably, the wall 72 of the frame 10 is cast with four pins 75 projecting from the lower side surface, and the bearing supporting plate 70 is punched to provide registering holes 76 through which the pins 75 extend when the plate is located in the recess 73. The pins 75 and bosses 74 are staked over as shown in one operation.

The plate 70 may be circular in shape like the plate 40 of FIGS. 4 and 8, and be located in a recess 73 shaped to receive it instead of square as shown in FIGS. 5–7. In either modification, preferably the plate retaining means comprise the edge contacting projections 74 and the bosses 34 or pins 75 which extend through punched holes in the bearing supporting plates.

In FIG. 8, the shaft bearing mounting means comprises a supporting member also designated 32 to serve the same purpose as the radially extending wall 32 of the die cast frame 10 of the motor shown in FIG. 1. However, the supporting member 32 of FIG. 8 may be part of a motor or part of other mechanism which employs shaft bearing mounting means. The supporting member 32 of FIG. 8 is provided with an unmachined recess or bearing bore 33 for reception of the ball bearing 25. The diameter of the recess 33 is slightly greater than that of the bearing 25. The bearing 25 is supported in the recess 33 by a plate 40, such as heretofore described in connection with FIGS. 1–4, provided with a punched central opening 41 of such size that the concentric edge of the hole 41 snugly fits and engages the peripheral surface of the ball bearing 25. The plate 40 may be mounted on the supporting member 32 by the attaching means 34 of FIG. 1 or the means 74–76 of FIG. 5. The plate 40 is a relatively thin flat unflanged stamping. When the plate has been mounted on the supporting member 32, the plate is the sole direct support for the ball bearing and is in radial alignment with the ball race of the bearing 25. The edge engagement between the edge of the opening 41 in the plate 40 and the peripheral surface of the ball bearing 25, and the absence of contact between the surface of the bore 33 and ball bearing 25 avoids the need for fine machining of the bore 33 for reception of the bearing 25.

Changes may be made in details of construction and form and arrangement of parts without departing from the scope of the invention as defined by the appended claims.

I claim:
1. Shaft bearing mounting means comprising
 (a) a ball bearing for a rotated shaft, said bearing having a cylindrical peripheral surface,
 (b) a supporting member provided with a bearing receiving bore larger in diameter than and radially spaced from the periphery of the ball bearing to be mounted therein,
 (c) a bearing supporting plate consisting of a thin metal stamping provided with a central opening equal in diameter to the ball bearing, said ball bearing being located in said opening in peripheral engagement with the edge of the plate defining said opening, and
 (d) means on the supporting member cooperating with the bearing supporting plate to locate and retain the plate on the supporting member in concentric relationship to the bearing bore in said supporting member.

2. The shaft bearing means defined by claim 1, in which the bearing receiving bore has an unmachined surface and is spaced from the ball bearing by said plate.

3. The shaft bearing means defined by claim 1, in which the supporting member is die cast and the bearing receiving bore therein is unmachined.

4. The shaft bearing means defined by claim 1, in which the plate extends radially from the ball race in said bearing.

5. The shaft bearing means defined by claim 1, in which the supporting member and the bearing supporting plate have flat contacting surfaces.

6. The shaft bearing means defined by claim 1, in which the plate locating and retaining means comprises a plurality of bosses on the supporting member and a plurality of holes in the plate registering with said bosses, said bosses extending through said holes and being spun over into contact with the plate.

7. The shaft bearing means defined by claim 1, in which the plate locating and retaining means comprise a recess cast in the supporting member surrounding the bearing bore and adapted to receive said plate, the surface defining the outer edge of the recess engaging the edge of the plate, and a plurality of projections cast on the supporting member adjacent the recess edge, said projections engaging the plate and retaining the plate in said recess.

8. The shaft bearing means defined by claim 1, in which the bearing bore and the plate locating and retaining means are cast in the supporting member from the same side of a die.

9. The shaft bearing means defined by claim 1, in which the bearing supporting plate is a thin metal stamping approximately .050" thick.

10. In a motor comprising an armature shaft and a ball bearing for said shaft, the improvement which comprises
  (a) a die cast frame having a radially extending wall provided with a cast unmachined centrally located bearing bore larger in diameter than and radially spaced from the periphery of the ball bearing to be mounted therein,
  (b) a bearing supporting plate consisting of a flat thin metal stamping provided with a central opening equal in diameter to the diameter of the ball bearing to be supported therein, said ball bearing being located in said opening in peripheral engagement with the edge of the plate defining said opening, and
  (c) means on the radially extending wall of the die cast frame cooperating with the bearing supporting plate to locate the plate concentrically on the wall and to retain the plate thereon in concentric relationship to the bearing bore in the radial wall.

11. A motor comprising
  (a) a die cast frame having a radially extending wall which has die cast therein a central unmachined bearing bore and members extending in directions parallel to the axis of the frame which have cast therein a plurality of stud holes extending in directions parallel to the axis of the frame,
  (b) a shaft,
  (c) a bearing for the shaft located in the bore and projecting axially therefrom,
  (d) the bore being cast diametrically larger than the bearing,
  (e) a bearing supporting plate provided with a bearing receiving central hole,
  (f) said plate supporting the bearing concentrically and being located in side surface contact with said radial wall,
  (g) means on the die cast frame radial wall cooperating with the bearing supporting plate to locate and retain the plate on the frame concentrically to the shaft and stud holes,
  (h) an armature on the shaft,
  (i) a field core,
  (j) field pole pieces between the armature and the field core, and
  (k) a plurality of studs connecting the field core to said frame members in concentric relationship to the armature, whereby the pole pieces are spaced from the armature by an air gap of uniform radial width, the said bore, plate locating and retaining means, and stud holes being cast in the die cast frame from the same side of a die.

References Cited by the Examiner

UNITED STATES PATENTS

| | | | |
|---|---|---|---|
| 2,685,658 | 8/1954 | Freiertag | 310—90 |
| 2,704,693 | 3/1955 | Schwan | 310—90 |
| 2,938,757 | 5/1960 | Pieper | 308—190 |
| 3,037,822 | 6/1962 | Plummer | 310—90 |
| 3,145,313 | 8/1964 | Tupper | 310—90 |

MILTON O. HIRSHFIELD, *Primary Examiner.*

L. L. SMITH, *Assistant Examiner.*